United States Patent
Kim et al.

(10) Patent No.: US 9,806,363 B2
(45) Date of Patent: Oct. 31, 2017

(54) APPARATUS AND METHOD FOR SOFTSENSING FUEL CELL SYSTEM

(71) Applicant: Korea Institute of Energy Research, Daejeon (KR)

(72) Inventors: Minjin Kim, Daejeon (KR);
Young-Jun Sohn, Daejeon (KR);
Gu-Gon Park, Daejeon (KR);
Byungchan Bae, Seoul (KR);
Sung-Dae Yim, Daejeon (KR);
Young-Woo Choi, Cheongju-si (KR);
Seok-Hee Park, Daejeon (KR);
Tae-Hyun Yang, Daejeon (KR);
Won-Yong Lee, Daejeon (KR);
Chang-Soo Kim, Incheon (KR)

(73) Assignee: KOREA INSITUTE OF ENERGY RESEARCH, Daejeon (KR)

( * ) Notice: Subject to any disclaimer, the term of this patent is extended or adjusted under 35 U.S.C. 154(b) by 517 days.

(21) Appl. No.: 14/183,860

(22) Filed: Feb. 19, 2014

(65) Prior Publication Data
US 2014/0236535 A1    Aug. 21, 2014

(30) Foreign Application Priority Data

Feb. 21, 2013  (KR) .................. 10-2013-0018854
Feb. 21, 2013  (KR) .................. 10-2013-0018856

(51) Int. Cl.
*H01M 8/04492* (2016.01)
*H01M 8/04828* (2016.01)
(Continued)

(52) U.S. Cl.
CPC ..... *H01M 8/04514* (2013.01); *H01M 8/0438* (2013.01); *H01M 8/0444* (2013.01);
(Continued)

(58) Field of Classification Search
CPC .............. G01R 31/36; H01M 8/04514; H01M 8/04992; H01M 8/04828; H01M 8/04791;
(Continued)

(56) References Cited

U.S. PATENT DOCUMENTS

| | | |
|---|---|---|
| 2008/0182139 A1 | 7/2008 | Ganapathy et al. |
| 2011/0244350 A1 | 10/2011 | Okuyoshi et al. |

FOREIGN PATENT DOCUMENTS

| | | |
|---|---|---|
| JP | 2007157414 | 6/2007 |
| KR | 1020030016450 | 3/2003 |

OTHER PUBLICATIONS

Arce et al., Real-Time Implementation of a Constrained MPC for Efficient Airflow Control in a PEM Fuel Cell, Jun. 2010, IEEE Transactions on Industrial Electronics, vol. 57, No. 6, pp. 1892-1905.*

Boccaletti et al., A Reformer Model for Fuel Cell Power Systems, Apr. 12-14, 2007, POWERENG 2007, Setubal, Portugal, pp. 347-352.*

(Continued)

*Primary Examiner* — Toan Le
(74) *Attorney, Agent, or Firm* — Cantor Colburn LLP

(57) ABSTRACT

Provided is an apparatus for soft-sensing a fuel cell system. The apparatus includes: a connecting unit detachable from a control unit for being connected to an outside of a stationary fuel cell system; a collecting unit connected to the connecting unit and receiving data of the stationary fuel cell system; a quality variable predicting unit connected to the collecting unit and predicting a quality variable of the stationary fuel cell system based on the received data; and a monitoring unit connected to the quality variable predicting unit and outputting the predicted quality variable. The quality variable predicting unit is configured to predict the quality variable predictable including at least any one of a concentration of carbon monoxide in a reformed gas at a rear end of a fuel converting system, and a concentration of methane in the reformed gas at the rear end of the fuel converting system.

5 Claims, 10 Drawing Sheets

(51) Int. Cl.
*H01M 8/04992* (2016.01)
*H01M 8/04313* (2016.01)
*H01M 8/0438* (2016.01)
*H01M 8/0444* (2016.01)
*H01M 8/04694* (2016.01)
*H01M 8/04791* (2016.01)

(52) U.S. Cl.
CPC ... *H01M 8/04313* (2013.01); *H01M 8/04522* (2013.01); *H01M 8/04694* (2013.01); *H01M 8/04791* (2013.01); *H01M 8/04828* (2013.01); *H01M 8/04992* (2013.01); *H01M 2250/10* (2013.01); *H01M 2250/20* (2013.01); *Y02B 90/14* (2013.01); *Y02T 90/32* (2013.01)

(58) Field of Classification Search
CPC ......... H01M 8/04738; H01M 8/04731; H01M 8/04723; H01M 8/04694; H01M 8/04619; H01M 8/04604; H01M 8/04589; H01M 8/04559; H01M 8/04522; H01M 8/0444; H01M 8/0438; H01M 8/04313
See application file for complete search history.

(56) References Cited

OTHER PUBLICATIONS

Napoli et al., Data Driven Model for a Fuel Cell Stack Development in a Complex Multi-Source Hybrid Renewable Energy System, Apr. 2010, RE&PQJ, vol. 1, No. 8, pp. 983-988.*

* cited by examiner

APPARATUS AND METHOD FOR SOFTSENSING FUEL CELL SYSTEM

CROSS-REFERENCE TO RELATED APPLICATIONS

This application claims priority under 35 U.S.C. §119 to Korean Patent Application Nos. 10-2013-0018854, filed on Feb. 21, 2013 and 10-2013-0018856 filed on Feb. 21, 2013 in the Korean Intellectual Property Office, the disclosure of which is incorporated herein by reference in its entirety.

TECHNICAL FIELD

The following disclosure relates to an apparatus and a method for soft-sensing a vehicle or stationary fuel cell system, and more particularly, to an apparatus and a method for soft-sensing a vehicle or stationary fuel cell system capable of predicting a quality variable based on a process variable and providing the predicted quality variable in real time.

BACKGROUND

A fossil fuel has very limited reserves, such that it can not but be depleted. Particularly, since the fossil fuel is a main discharging source of greenhouse gas causing global warming, advanced countries have concentrated their efforts on developing alternative energy or hydrogen energy using nuclear power in order to decrease the fossil fuel. As an energy source that has been spotlighted as the alternative energy, there are several energy sources such as solar energy, wind power, hydrogen energy, biomass, and the like. In the case of solar heat or wind power, an auxiliary device should be provided, a wide space is required in order to install a heat collecting plat or a windmill, and other environmental problems such as destruction of an ecosystem, noise, and the like, are generated. The future energy requires requirements such as environmental acceptability, economic productibility, eternal capability, and the like.

A fuel cell, which is a cell directly converting chemical energy generated by oxidation into electric energy, is a new environment-friendly future technology generating the electric energy from materials richly present on Earth, such as hydrogen or oxygen.

In the fuel cell, oxygen is supplied to a cathode and hydrogen is supplied to an anode, such that an electrochemical reaction is performed in a form of a reverse reaction of electrolysis of water to generate electricity, heat, and water, thereby producing electric energy at a high efficiency without generating pollution.

The fuel cell producing the electricity and the heat using a fuel such as city gas, or the like, which is a typical new growth engine industry having a very large job creation effect as well as an effect of decreasing greenhouse gas, has been actively commercialized all over the world.

The fuel cell is mainly satisfactory in that it may produce both of the electricity and the warm water, save electricity and heating expenses, and contribute to prevention of global warming.

When the fuel cell is installed at the home, a consumer may decrease an energy cost and may benefit by a rise in a value of a house due to an environment-friendly feature. The government may have an advantage that a discharge of greenhouse gas may be decreased by 30% or more as compared with an existing power generation scheme. However, in spite of these advantages, a home fuel cell has not been actively popularized domestically. The reason is that awareness of consumers for the fuel cell is low and a product is expensive. Nevertheless, it is undoubted that the fuel cell is required in terms of environment and a broad perspective.

One alternative to an electricity supplying problem of Earth is a renewable distributed energy generator (RDEG) technology. In the RDEG technology, electric power may be produced at a consumption point, and expensive and inefficient transmission and distribution networks may be decreased. In the RDEG technology, greenhouse gas is discharged as small as possible while producing the electric power. This technology provides benefits such as more controls, agility, a cost decrease, and the like, to a customer and has potential power capable of minimizing complexity associated with a centralized energy resource. However, nowadays, economics of the RDEG technology has not secured its position. For this reason, the government directly provides a subsidy in commercialization of the RDEG technology.

The RDEG technology is mainly configured of three technologies. They are a solar light technology, a small wind power technology, and a fuel cell technology. When analyzing an electric power market, the RDEG technology has occupied only a very small portion in all power generation sources.

A stationary fuel cell has a large potential power in the long view. The stationary fuel cell corresponds to a clean and efficient power source and may have a power generation capacity of 1 KW to 10 MW. Through a more reformative technology, the fuel cell may use an existing or accessible fuel such as natural gas or use other fuels including a bio-fuel and gas, which are byproducts of an adjacent industrial process. In the case in which the fuel cell is combined with a combined heat and power plant, efficiency may be significantly increased from about 40 to 50% to about 85%. However, a cost problem makes it difficult to predict a long-term potential power of this technology. In order to decrease the cost, a scale should be increased. However, in order to increase the scale, the cost should be significantly decreased. When a continuous support program of the government is not present, it may not be appreciated whether this technology may arrive at a success critical point and when this technology arrives at the success critical point.

In order to commercialize the stationary fuel cell, there are many problems that are to be solved, such as a method for manufacturing a stationary fuel cell at a reasonable cost, development of a stationary fuel cell system having high efficiency, and the like. Among them, a technology for predicting a quality variable that may not be measured directly by a sensor is required in order to improve stability in operating a fuel cell system and improve performance of the fuel cell system.

In addition, a fuel cell vehicle is the future vehicle using a scheme in which a fuel cell using a chemical reaction between hydrogen and oxygen drives an electric motor, and it is likely that the fuel cell vehicle will play a leading role in the future vehicle industry. An advantage of this technology is to decrease an operation cost by significant improvement of fuel efficiency and expect an air pollution preventing effect by a decrease in exhaust gas.

In order to commercialize the fuel cell vehicle, there are many problems that are to be solved, such as a method for manufacturing a fuel cell vehicle at a reasonable cost, development of a fuel cell system having high efficiency, a technology for obtaining a large amount of hydrogen at a reasonable cost, a safe hydrogen transporting system, a hydrogen storage, a pressing apparatus for charging a vehicle at a reasonable cost, build-up of a hydrogen infrastructure, and the like. Among them, a technology for predicting a quality variable that may not be measured directly by a sensor is required in order to improve stability in operating a fuel cell system and improve performance of the fuel cell system.

US Patent Application Publication No. 2011-0244350 has disclosed a fuel cell system.

RELATED ART DOCUMENT

Patent Document

US Patent Application Publication No. 2011-0244350

SUMMARY

An embodiment of the present invention is directed to providing an apparatus and a method for soft-sensing a vehicle or stationary fuel cell system capable of predicting a quality variable that may not be measured directly by a sensor, based on a process variable, and providing the predicted quality variable, in order to improve stability in operating the fuel cell system and improve performance of the fuel cell system.

In one general aspect, an apparatus for soft-sensing a fuel cell system includes: a connecting unit 100 detachable from a control unit for being connected to the outside of the stationary fuel cell system 70; a collecting unit 200 connected to the connecting unit 100 and receiving data of the stationary fuel cell system; a quality variable predicting unit 300 connected to the collecting unit 200 and predicting a quality variable of the stationary fuel cell system based on the received data; and a monitoring unit 400 connected to the quality variable predicting unit 300 and outputting the predicted quality variable.

The collecting unit 200 may collect at least any one of a reformer operation temperature, a reformer injection fuel flow rate, a shift converter operation temperature, a shift converter injection flow rate, a carbon monoxide cleaner operation temperature, a carbon monoxide cleaner injection flow rate, a burner pressure, a burner air fuel ratio (ratio between injected air and fuel), a hydrogen flow rate at an inlet of a hydrogen electrode of a stationary fuel cell stack, a hydrogen stoichiometric number at the inlet of the hydrogen electrode of the stationary fuel cell stack, a hydrogen humidity at the inlet of the hydrogen electrode of the stationary fuel cell stack, an oxygen flow rate at an inlet of an oxygen electrode of the stationary fuel cell stack, an oxygen stoichiometric number at the inlet of the oxygen electrode of the stationary fuel cell stack, an oxygen humidity at the inlet of the oxygen electrode of the stationary fuel cell stack, a pressure difference between the inlet and an outlet of the hydrogen electrode of the stationary fuel cell stack, a pressure difference between the inlet and an outlet of the oxygen electrode of the stationary fuel cell stack, and an operation current of the stationary fuel cell stack.

The quality variable predictable by the quality variable predicting unit 300 may be at least any one of a concentration of carbon monoxide in reformed gas at a rear end of a fuel converting system, a concentration of methane in the reformed gas at the rear end of the fuel converting system, and a flooding index of a stationary fuel cell stack.

The monitoring unit 400 may be included in a controlling unit controlling the stationary fuel cell system 70.

The apparatus 1000 for soft-sensing a fuel cell system may further include: a power supplying unit 600 including a battery for supplying power and supplying the power to the apparatus for soft-sensing a stationary fuel cell system.

The apparatus 1000 for soft-sensing a fuel cell system may further include: a data storing unit 300 connected to the quality variable predicting unit 300 and storing and managing all data; and a fuel cell analyzing unit 800 connected to the data storing unit 700 and analyzing the stationary fuel cell system 70 to estimate a feature of the stationary fuel cell system 70.

In another general aspect, a method for soft-sensing a fuel cell system by an apparatus 1000 for soft-sensing a fuel cell system detachable from a control unit for being connected to the outside of the stationary fuel cell system 70 and configured to include a connecting unit 100, a collecting unit 200, a quality variable predicting unit 300, and a monitoring unit 400 includes: a process variable selecting step S10 of selecting a process variable having an effect on a quality variable; a modeling data collecting step S20 of collecting measurement results of a flooding index of a hydrogen electrode of a stationary fuel cell stack or a flooding index of an oxygen electrode of the stationary fuel cell stack, which is the quality variable, depending on a variation of the process variable selected in the process variable selecting step S10; model building-up step S30 of building-up an experiment model representing a correlation between the process variable and the quality variable collected in the modeling data collecting step S20; a model accuracy verifying step S40 of verifying a coefficient of determination ($R^2$: R-square) depending on a regression analysis of the model built-up in the model building-up step S30; and a model applying step S50 of applying the model verified in the modeling accuracy verifying step S40 in the case in which the coefficient of determination depending on the regression analysis of the model in the modeling accuracy verifying step S40 is a predetermined allowable value or more.

The process variable in the process variable selecting step S10 may be at least any one of a reformer operation temperature, a reformer injection fuel flow rate, a shift converter operation temperature, a shift converter injection flow rate, a carbon monoxide cleaner operation temperature, a carbon monoxide cleaner injection flow rate, a burner pressure, a burner air fuel ratio (ratio between injected air and fuel), a hydrogen flow rate at an inlet of a hydrogen electrode of the stationary fuel cell stack, a hydrogen stoichiometric number at the inlet of the hydrogen electrode of the stationary fuel cell stack, a hydrogen humidity at the inlet of the hydrogen electrode of the stationary fuel cell stack, an oxygen flow rate at an inlet of an oxygen electrode of the stationary fuel cell stack, an oxygen stoichiometric number at the inlet of the oxygen electrode of the stationary fuel cell stack, an oxygen humidity at the inlet of the oxygen electrode of the stationary fuel cell stack, a pressure difference between the inlet and an outlet of the hydrogen electrode of the stationary fuel cell stack, a pressure difference between the inlet and an outlet of the oxygen electrode of the stationary fuel cell stack, and an operation current of the stationary fuel cell stack.

The modeling data collecting step S20 may include: an operation range setting step S21 of setting an operable range of the process variable selected in the process variable selecting step S10; an design of experiments establishing step S22 of establishing a systematic design of experiments of the process variable depending on the operable range set in the operation range setting step S21; and a measuring step S23 of measuring at least any one of a humidity at an outlet of the hydrogen electrode or the oxygen electrode of the stationary fuel cell stack and a concentration of carbon monoxide or methane in reformed gas at a rear end of a fuel converting system depending on a changed value of the process variable depending on the design of experiments established in the design of experiments establishing step S22.

In the model building-up step, it may be judged that flooding has occurred when a humidity predicted as a model in each of the hydrogen electrode and the oxygen electrode of the stationary fuel cell stack is equal to or larger than a flooding value predetermined based on 100%, and it may be judged that the flooding has not occurred when the humidity is equal to or smaller than the flooding value.

In still another general aspect, an apparatus for soft-sensing a fuel cell system includes: a connecting part 100 detachable from a control unit for being connected to the outside of the vehicle fuel cell system 40; a collecting unit 200 connected to the connecting unit and receiving data of the vehicle fuel cell system 40; a quality variable predicting unit 300 connected to the collecting unit and predicting a quality variable of the vehicle fuel cell system 40 based on the received data; and a monitoring unit 400 connected to the quality variable predicting unit 300 and outputting the predicted quality variable.

The collecting unit may collect at least any one of a hydrogen flow rate at an inlet of a hydrogen electrode of a vehicle fuel cell stack, a hydrogen stoichiometric number at the inlet of the hydrogen electrode of the vehicle fuel cell stack, a hydrogen humidity at the inlet of the hydrogen electrode of the vehicle fuel cell stack, an oxygen flow rate at an inlet of an oxygen electrode of the vehicle fuel cell stack, an oxygen stoichiometric number at the inlet of the oxygen electrode of the vehicle fuel cell stack, an oxygen humidity at the inlet of the oxygen electrode of the vehicle fuel cell stack, a pressure difference between the inlet and an outlet of the hydrogen electrode of the vehicle fuel cell stack, a pressure difference between the inlet and an outlet of the oxygen electrode of the vehicle fuel cell stack, and an operation current of the vehicle fuel cell stack.

The quality variable predictable by the quality variable may be a flooding index of a vehicle fuel cell stack.

The monitoring unit 400 may be included in a driver's seat of a fuel cell vehicle to thereby be monitored.

The apparatus for soft-sensing a fuel cell system may further include: a power supplying unit including a battery for supplying power and supplying the power to the apparatus for managing a vehicle fuel cell system.

The apparatus 1000 for soft-sensing a fuel cell system may further include: a data storing unit connected to the quality variable predicting unit and storing and managing all data; and a fuel cell analyzing unit connected to the data storing unit and analyzing the vehicle fuel cell system to estimate a feature of the vehicle fuel cell system.

In yet still another general aspect, a method for soft-sensing a fuel cell system by an apparatus 1000 for soft-sensing a fuel cell system detachable from a control unit for being connected to the outside of the vehicle fuel cell system 40 and configured to include a connecting unit 100, a collecting unit 200, a quality variable predicting unit 300, and a monitoring unit 400 includes: a process variable selecting step S10 of selecting a process variable having an effect on a quality variable; a modeling data collecting step S20 of collecting measurement results of a flooding index of a hydrogen electrode of a vehicle fuel cell stack or a flooding index of an oxygen electrode of the vehicle fuel cell stack, which is the quality variable, depending on a variation of the process variable selected in the process variable selecting step S10; model building-up step S30 of building-up an experiment model representing a correlation between the process variable and the quality variable collected in the modeling data collecting step S20; a model accuracy verifying step S40 of verifying a coefficient of determination ($R^2$: R-square) depending on a regression analysis of the model built-up in the model building-up step S30; and a model applying step S50 of applying the model verified in the modeling accuracy verifying step S40 in the case in which the coefficient of determination depending on the regression analysis of the model in the modeling accuracy verifying step S40 is a predetermined allowable value or more.

The process variable in the process variable selecting step may be at least any one of a hydrogen flow rate at an inlet of a hydrogen electrode of the vehicle fuel cell stack, a hydrogen stoichiometric number at the inlet of the hydrogen electrode of the vehicle fuel cell stack, a hydrogen humidity at the inlet of the hydrogen electrode of the vehicle fuel cell stack, an oxygen flow rate at an inlet of an oxygen electrode of the vehicle fuel cell stack, an oxygen stoichiometric number at the inlet of the oxygen electrode of the vehicle fuel cell stack, an oxygen humidity at the inlet of the oxygen electrode of the vehicle fuel cell stack, a pressure difference between the inlet and an outlet of the hydrogen electrode of the vehicle fuel cell stack, a pressure difference between the inlet and an outlet of the oxygen electrode of the vehicle fuel cell stack, and an operation current of the vehicle fuel cell stack.

The modeling data collecting step S20 may include: an operation range setting step S21 of setting an operable range of the process variable selected in the process variable selecting step S10; an design of experiments establishing step S22 of establishing a systematic design of experiments of the process variable depending on the operable range set in the operation range setting step S21; and a humidity measuring step S23 of measuring a humidity at an outlet of the hydrogen electrode or the oxygen electrode of the vehicle fuel cell stack depending on a changed value of the process variable depending on the design of experiments established in the design of experiments establishing step S22.

In the model building-up step, it may be judged that flooding has occurred when a humidity predicted as a model in each of the hydrogen electrode and the oxygen electrode of the vehicle fuel cell stack is equal to or larger than a flooding value predetermined based on 100%, and it may be judged that the flooding has not occurred when the humidity is equal to or smaller than the flooding value.

DETAILED DESCRIPTION OF MAIN ELEMENTS

10: Vehicle fuel cell module, 11: Vehicle fuel cell stack 12: DC to DC converter, 13: Balance of plant (BOP), 20: Electric vehicle module, 21: Vehicle auxiliary device, 22: DC to AC inverter, 23: Motor, 24: Transmission, 25: Wheel, 29: Battery, 30: Hydrogen fuel, 40: Vehicle fuel cell system, 50: Stationary fuel cell module, 51: Stationary fuel cell stack, 52: DC to DC converter, 53: DC to AC inverter, 54: Balance of plant (BOP), 60: Fuel converting system, 61: Reformer, 62: Burner, 70: Stationary fuel cell system, 1000: Apparatus for soft-sensing fuel cell system, 100: Connecting unit, 200: Collecting unit, 300: Quality variable predicting unit, 400: Monitoring unit, 600: Power supplying unit, 700: Data storing unit, 800: Fuel cell analyzing unit, S10: Process variable selecting step, S20: Modeling data collecting step, S21: Operation range setting step, S22: design of experiments establishing step, S23: Humidity measuring step, S30: Model building-up step, S40: Model accuracy verifying step, S50: Model applying step

DETAILED DESCRIPTION OF EMBODIMENTS

Hereinafter, an apparatus for managing a stationary fuel cell system according to an exemplary embodiment of the present invention will be described in detail with reference to the accompanying drawings.

Figure 1:
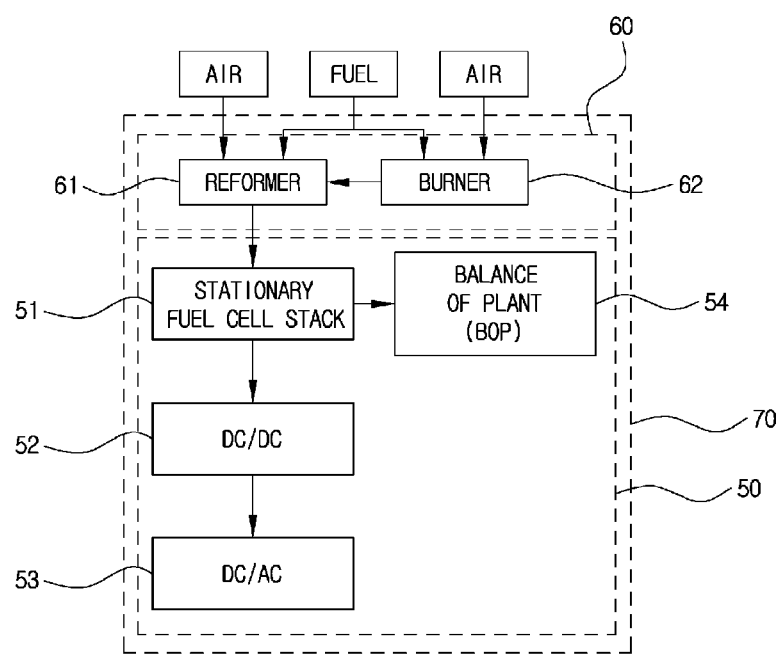
FIG. 1 is a conceptual diagram of a fuel cell system reforming and using a fuel according to the related art.
Figure 2:
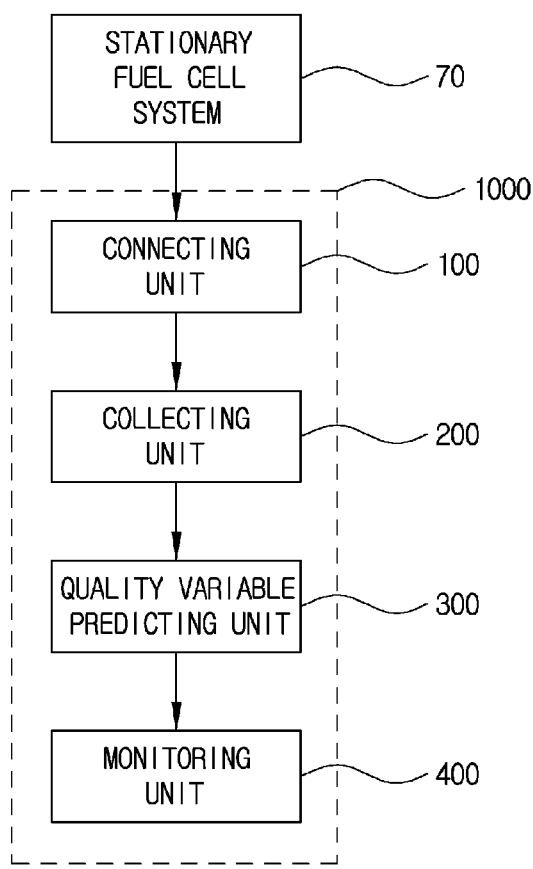
FIGS. 2 to 4 are conceptual diagrams of an apparatus for soft-sensing a fuel cell system according to an exemplary embodiment of the present invention.
Figure 3:
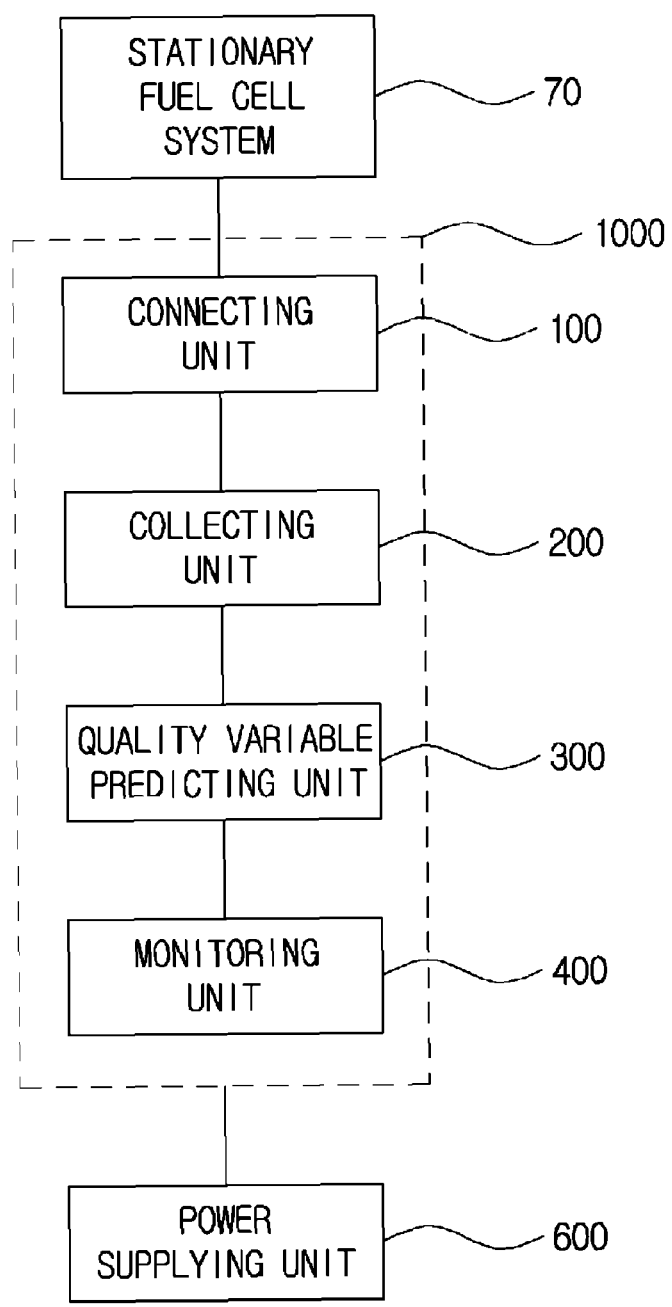
Figure 4:
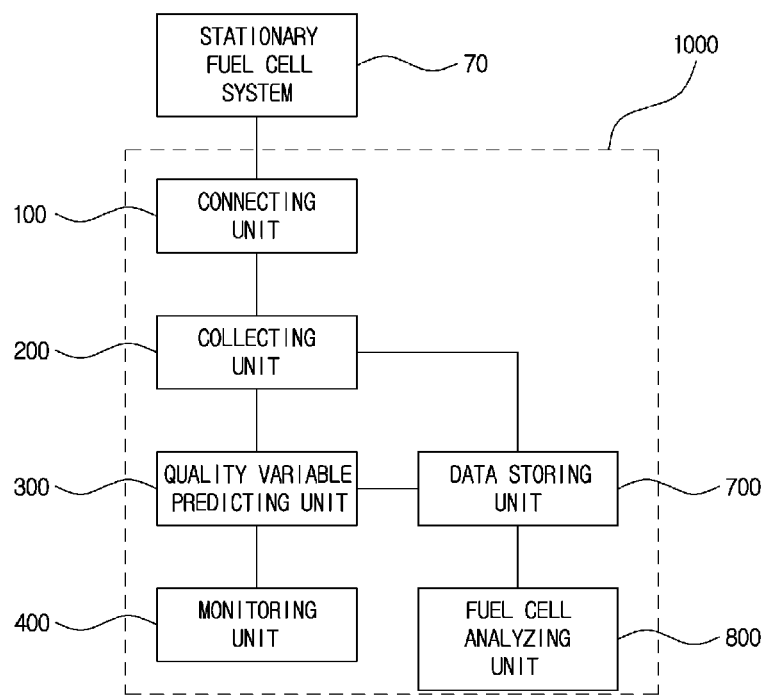
Figure 5:
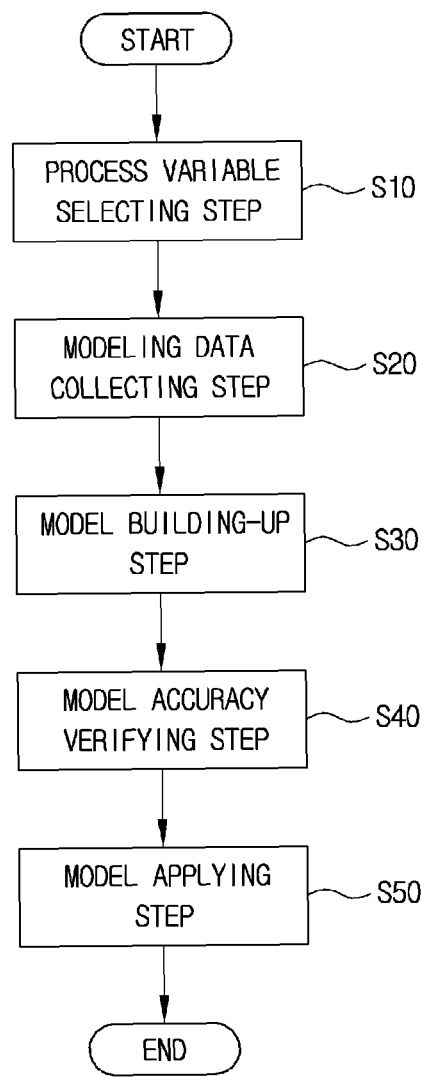
FIGS. 5 and 6 are flow charts of a method for soft-sensing a fuel cell system according to an exemplary embodiment of the present invention.
Figure 6:
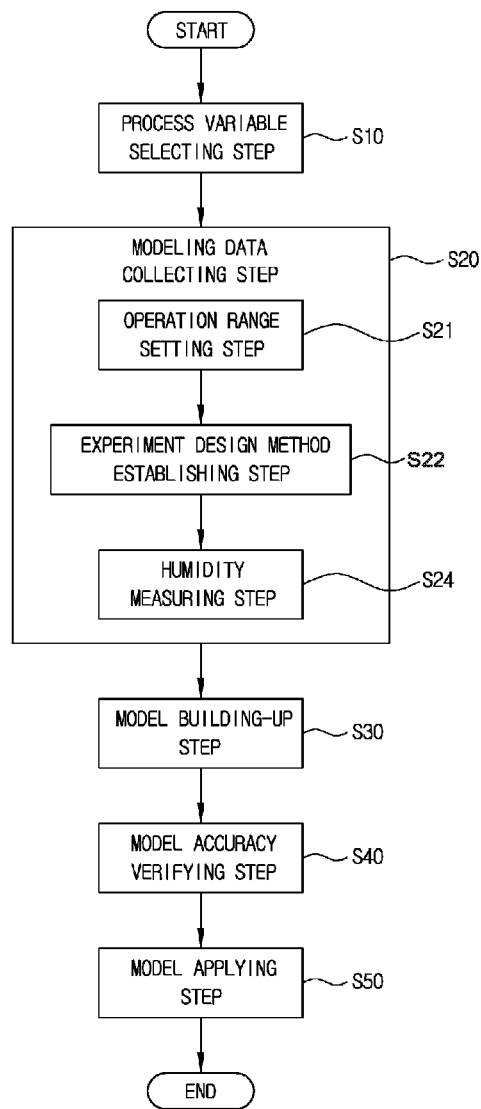
Figure 7:
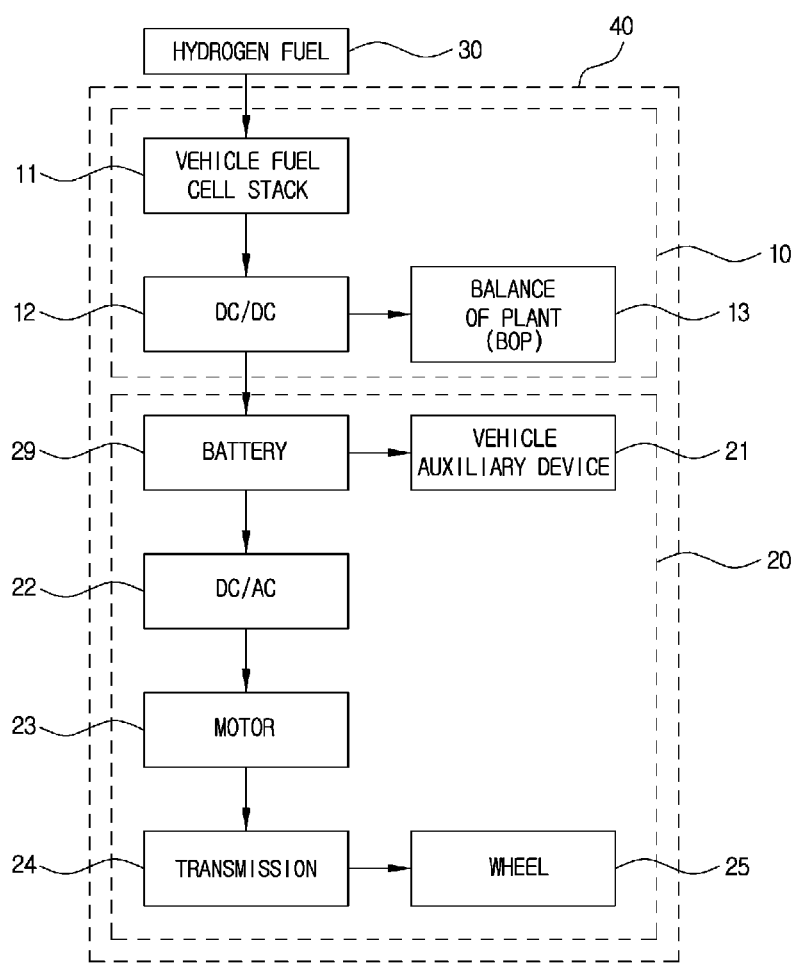
FIG. 7 is conceptual diagram of a fuel cell vehicle directly charged with a hydrogen fuel and using the hydrogen fuel according to the related art.
Figure 8:
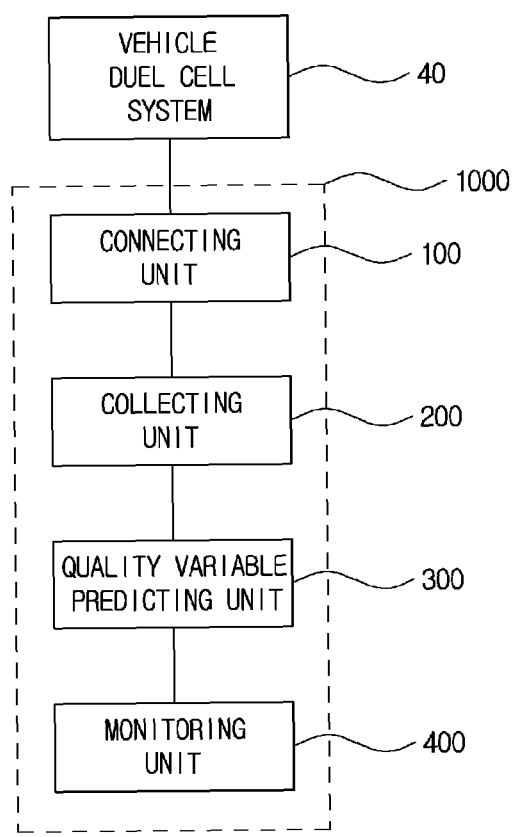
FIGS. 8 to 10 are conceptual diagrams of an apparatus for soft-sensing a fuel cell system according to an exemplary embodiment of the present invention.
Figure 9:
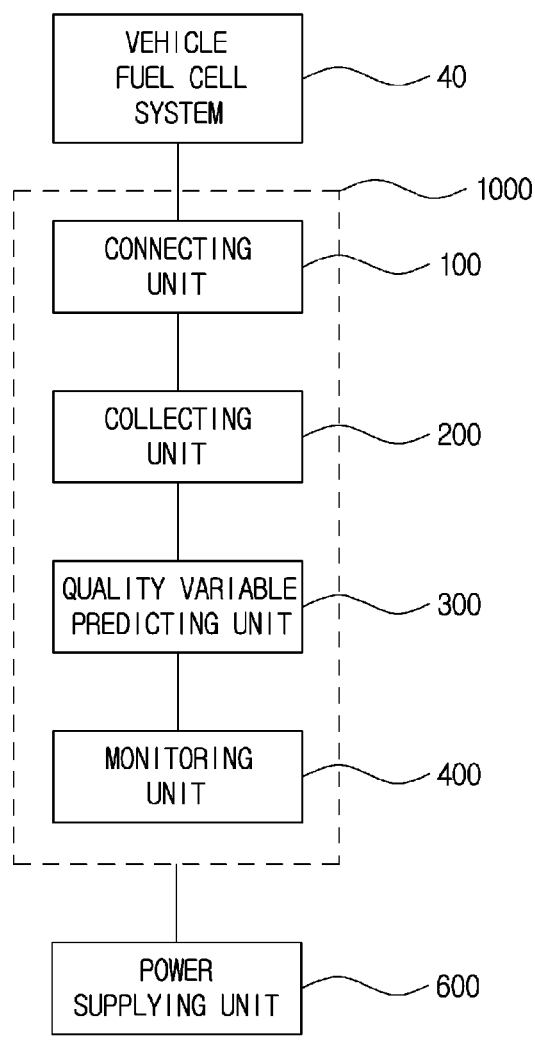
Figure 10:
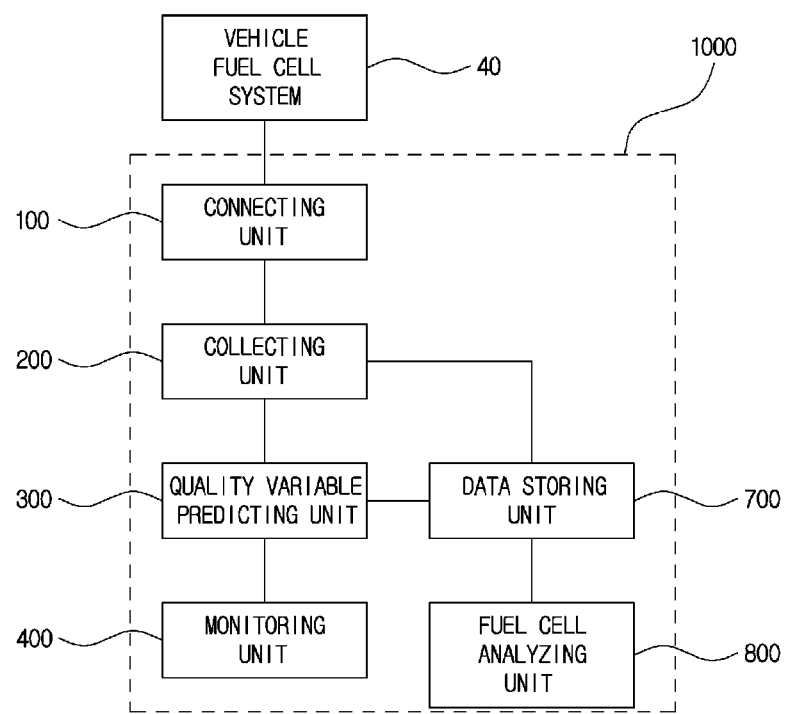

FIG. 1 is a conceptual diagram of a fuel cell system reforming and using a fuel according to the related art, FIGS. 2 to 4 are conceptual diagrams of an apparatus for soft-sensing a fuel cell system according to an exemplary embodiment of the present invention, FIGS. 5 and 6 are flow charts of a method for soft-sensing a fuel cell system according to an exemplary embodiment of the present invention, FIG. 7 is conceptual diagram of a fuel cell vehicle directly charged with a hydrogen fuel and using the hydrogen fuel according to the related art, and FIGS. 8 to 10 are conceptual diagrams of an apparatus for soft-sensing a fuel cell system according to an exemplary embodiment of the present invention.

An apparatus for managing a stationary fuel cell system according to an exemplary embodiment of the present invention receives data of a stationary fuel cell module to estimate performance of the stationary fuel cell module and calculates an efficient operation method depending on environmental information and an operation object to control the stationary fuel cell module.

A general stationary fuel cell system reforms and uses a fuel. Here, a usable fuel may be a fossil fuel, bio-mass (methane ($CH_4$), or the like), water, or the like. Here, the fossil fuel indicates liquefied natural gas (LNG), natural gas (NG), liquefied petroleum gas (LPG), naphtha, coal gas, methanol, and the like.

As shown in FIG. 1, a stationary fuel cell system 70 reforming and using a fuel may be configured to include a stationary fuel cell module 50 and a fuel converting system 60. The stationary fuel cell module 50 may be configured to include a stationary fuel cell stack 51, a direct current (DC) to DC converter 52, a DC to alternating current (AC) converter 53, and a balance of plant (BOP) 54. Here, the BOP 54 may be a stack air blower, a stack cooling water pump, a stack humidifier, a reformer fuel blower, a reformer air blower, a reformer burner fuel blower, a reformer burner air blower, a reformer water pump, a heat exchanger, a radiator, a cooling fan, a control device, various valves and sensors, and the like. Here, the BOP may be configured to include a stack air blower (not shown) and a humidifier (not shown). In addition, the fuel converting system 60 may include a reformer 61 and a burner 62.

Among various fuel cells, a phosphoric acid fuel cell (PAFC) having very excellent technical completeness, a polymer electrolyte fuel cell (PEFC) that has been rapidly developed for a vehicle or a home, and the like, use hydrogen as a fuel, such that they require a reformer reforming natural gas or hydrocarbon such as methanol, or the like, which is a raw material, into the hydrogen. Therefore, it is one of particularly important technology developing tasks in the fuel cell to develop a reforming system. The fuel converting (reforming) system for a fuel cell is configured of three steps of desulfurization, steam reforming, and CO shift.

An operation of the stationary fuel cell system reforming and using a fuel will be schematically described. The burner 62 receives a fuel and air and transfers heat generated by igniting the fuel to the reformer. The reformer 61 receives a fuel and air, reforms the fuel using the heat received from the burner 62, and transfers a reformed hydrogen fuel to the stationary fuel cell stack 51 of the stationary fuel cell module 50. The stationary fuel cell stack 51 receives the hydrogen fuel converted by the fuel converting system 60 and receives a compressed oxidizing agent (air, or the like) humidified by the stack air blower and the humidifier to generate electricity and heat. The electric energy generated by the stationary fuel cell stack 51 supplies electricity required for the BOP 54 and is converted into electric power usable in a load using the DC to DC converter 52 and the DC to AC inverter 53, such that the electricity is supplied to the load. In addition, heat energy generated by the reformer 61, the burner 62, and the Stationary fuel cell module 50 may be used for water warming, heating, and the like.

As shown in FIG. 2, an apparatus for soft-sensing a fuel cell system according to an exemplary embodiment of the present invention is configured to include a connecting unit 110, a collecting unit 200, a quality variable predicting unit 300, and a monitoring unit 400.

A home fuel cell, a building fuel cell, or a commercial fuel cell is called the stationary fuel cell, and the general stationary fuel cell system 70 includes a control unit (not shown) receiving information on the fuel converting system 60 and the stationary fuel cell module 50 to control the stationary fuel cell system 70 and capable of being connected to the outside. The control unit (not shown) for being connected to the outside may be included in the stationary fuel cell module 50 or the fuel converting system 60 or may be included in the stationary fuel cell system 70 including the stationary fuel cell module 50 and the fuel converting system 60.

The connecting unit 100 is connected to the control unit (not shown) for being connected to the outside of the stationary fuel cell system 70. Here, the connecting unit 100 may provide information required by the collecting unit 200 and may be connected to the stationary fuel cell module 50, the fuel converting system 60, or the control unit for being connected to the outside of the stationary fuel cell system 70.

In other words, the connecting unit 100 is connected to the control unit for being connected to the outside of the stationary fuel cell system 70 that has been already installed and is being operated, thereby making it possible to predict a quality variable. That is, the connecting unit is additionally connected to the stationary fuel cell system 70 according to the related art, thereby making it possible to predict the quality variable that may not be measured or predicted in the related art.

The collecting unit 200 is connected to the connecting unit 100 and receives data of the stationary fuel cell system 70. The data input from the stationary fuel cell system 70 may be a directly measured data, a data input from the outside, and a data calculated using the directly measured data. Here, the directly measured data, the data input from the outside, and the data calculated using the directly measured data may be used in order to predict a concentration of carbon monoxide in reformed gas at a rear end of the fuel converting system, a concentration of methane in the reformed gas at the rear end of the fuel converting system, and a flooding index of the stationary fuel cell stack. Here, the collecting unit 200 may collect at least any one of a reformer operation temperature, a reformer injection fuel flow rate, a shift converter operation temperature, a shift converter injection flow rate, a carbon monoxide cleaner operation temperature, a carbon monoxide cleaner injection flow rate, a burner pressure, a burner air fuel ratio (ratio between injected air and fuel), a hydrogen flow rate at an inlet of a hydrogen electrode of the stationary fuel cell stack, a hydrogen stoichiometric number at the inlet of the hydrogen electrode of the stationary fuel cell stack, a hydrogen humidity at the inlet of the hydrogen electrode of the stationary fuel cell stack, an oxygen flow rate at an inlet of an oxygen electrode of the stationary fuel cell stack, an oxygen stoichiometric number at the inlet of the oxygen electrode of the stationary fuel cell stack, an oxygen humidity at the inlet of the oxygen electrode of the stationary fuel cell stack, a pressure difference between the inlet and an outlet of the hydrogen electrode of the stationary fuel cell stack, a pressure difference between the inlet and an outlet of the oxygen electrode of the stationary fuel cell stack, and an operation current of the stationary fuel cell stack.

The quality variable predicting unit 300 is connected to the collecting unit 200 and predicts a quality variable of the stationary fuel cell system 70 based on the received data. Here, the quality variable predictable by the quality variable predicting unit 300 may be at least any one of a concentration of carbon monoxide in reformed gas at a rear end of the fuel converting system, a concentration of methane in the reformed gas at the rear end of the fuel converting system, and a flooding index of the stationary fuel cell stack. A phenomenon that water is not normally discharged to the outside in a cell of a polymer electrolyte fuel cell is called flooding. When the flooding occurs, it is difficult for the fuel and the oxygen to move to an electrode catalyst, such that a voltage of the cell is decreased. The flooding is one of the main causes intensifying a voltage deviation between cells particularly in the stack.

In the case in which the fuel and the air are not uniformly supplied to the respective cells in the stack, a flooding phenomenon may occur in a specific cell having a relatively low flow rate. Since the flooding may occur due to various causes such as a differential pressure between an inlet and an outlet of the stack, a utilization ratio of a fuel or air, an operation temperature of the stack, a cooling water temperature deviation between the inlet and the outlet, and the like, it is very important to manage the water in the stack.

The reason why it is difficult to accurately predict the quality variable is that theoretical establishment of a complicated chemical reaction and electrochemical reaction in the fuel converting system and the fuel cell stack is insufficient, such that an accurate theoretical correlation between an adjustable operation variable and the quality variable is not investigated.

In addition, the number of adjustable operation variables of the fuel converting system and the fuel cell stack is more than approximately several tens, and when it is assumed that a correlation between the operation variables and the quality variables are experimentally analyzed in a state in which operable ranges of the respective variables are divided into only three levels, that is, high/middle/low levels, experiments of approximately hundreds of thousands or more should be performed, which is actually difficult. Even though an experimental model having high predictability is built-up by spending a lot of time and cost, system components, connection pipes, and the like, are changed or deteriorated over time, such that accuracy of prediction of the experimental model is gradually decreased. In order to solve this problem, it is required to periodically manage the experimental model. However, according to the above-mentioned method, an excessive time and cost are required for maintenance of the experimental model. As the quality variable, there are a concentration of carbon monoxide in reformed gas at a rear end of the fuel converting system and a concentration of methane in the reformed gas at the rear end of the fuel converting system.

The monitoring unit 400 is connected to the quality variable predicting unit 300 and output the predicted quality variable. Here, the monitoring unit may be included in a controlling unit controlling the stationary fuel cell system.

As shown in FIG. 3, the apparatus 1000 for soft-sensing a fuel cell system according to an exemplary embodiment of the present invention may further include a power supplying unit 600 including a battery for supplying power and supplying the power to the apparatus 1000 for soft-sensing a fuel cell system.

As shown in FIG. 4, the apparatus 1000 for soft-sensing a fuel cell system according to an exemplary embodiment of the present invention may further include a data storing unit 700 and a fuel cell analyzing unit 800.

The data storing unit 700 is connected to the quality variable predicting unit 300 and stores and manages all data.

The fuel cell analyzing unit 800 is connected to the data storing unit 700 and interprets the stationary fuel cell system 70 to estimate a feature of the stationary fuel cell system 70. Here, the stored data may be process variables collected by the collecting unit, quality variables predicted based on the process variables, an experiment model built-up for predicting the quality variables, a period in which the experiment model is applied to predict the quality variables, and the like.

As shown in FIG. 5, a method for soft-sensing a fuel cell system according to an exemplary embodiment of the present invention by the apparatus 1000 for soft-sensing a fuel cell system detachable from a control unit for being connected to the outside of a stationary fuel cell system 70 and configured to include a connecting unit 100, a collecting unit 200, a quality variable predicting unit 300, and a monitoring unit 400 is configured to include a process variable selecting step S10, a modeling data collecting step S20, a model building-up step S30, a model accuracy verifying step S40, and a model applying step S50.

In the process variable selecting step S10, a process variable having an effect on a quality variable is selected.

This is to collect measurement results of the quality variable varied depending on a variation of the process variable selected in the process variable selecting step S10 to apply an optimal model appropriate for a current situation in real time.

In the modeling data collecting step S20, measurement results of a flooding index of a hydrogen electrode of a stationary fuel cell stack or a flooding index of an oxygen electrode of the stationary fuel cell stack, which is the quality variable, depending on the variation of the process variable selected in the process variable selecting step S10 are collected. Here, the process variable in the process variable selecting step S10 may be at least any one of a reformer operation temperature, a reformer injection fuel flow rate, a shift converter operation temperature, a shift converter injection flow rate, a carbon monoxide cleaner operation temperature, a carbon monoxide cleaner injection flow rate, a burner pressure, a burner air fuel ratio (ratio between injected air and fuel), a hydrogen flow rate at an inlet of a hydrogen electrode of the stationary fuel cell stack, a hydrogen stoichiometric number at the inlet of the hydrogen electrode of the stationary fuel cell stack, a hydrogen humidity at the inlet of the hydrogen electrode of the stationary fuel cell stack, an oxygen flow rate at an inlet of an oxygen electrode of the stationary fuel cell stack, an oxygen stoichiometric number at the inlet of the oxygen electrode of the stationary fuel cell stack, an oxygen humidity at the inlet of the oxygen electrode of the stationary fuel cell stack, a pressure difference between the inlet and an outlet of the hydrogen electrode of the stationary fuel cell stack, a pressure difference between the inlet and an outlet of the oxygen electrode of the stationary fuel cell stack, and an operation current of the stationary fuel cell stack.

As shown in FIG. 6, the modeling data collecting step S20 may include an operation range setting step S21, an design of experiments establishing step S22, and a measuring step S23.

In the operation range setting step S21, an operable range of the process variable selected in the process variable selecting step S10 is set.

In the design of experiments establishing step S22, a systematic design of experiments of the process variable depending on the operable range set in the operation range setting step S21 is established. In other words, since a lot of time and resources are consumed in order to measure all values based on the operable range set in the operation range setting step S21, values to be used for measurement in the operable range of the process variable may be set depending on the systematic design of experiments.

In the design of experiments establishing step S22, appropriate values (values capable of decreasing the number of experiments and securing accuracy as much as possible) are set in the operable ranges of the selected process variables in consideration of the number of experiments, and an design of experiments (pre-established academic study for calculating a minimum experiment method required for finding a correlation between experiment target variables and quality variables) of determining combinations (for example, when it is assumed that variables 1, 2, and 3 are operated as high/middle/low values, respectively, and experiments are performed, various combinations of experiments such as three methods of operating all of the variable 1, 2, and 3 as the high/middle/low values, and three methods of operating each of the variable 1, 2, and 3 as the high/middle/low values are possible, and at most twenty seven combinations of experiments are possible) between a large number of process variables based on a small number of set process variables and the values of the set process variables is performed to design the number of required experiments to be as small as possible. As described above, the values to be used for measurement in the operable range of the process variable are set depending on the systematic design of experiments established in the design of experiments establishing step S22, thereby making it possible to save a lot of time and resources.

In other words, since a lot of time and resources are consumed in order to measure the quality variables depending on all values (varied values of all process variables) based on the operable range set in the operation range setting step S21, the values to be used for measurement in the operable range of the process variable are set depending on the systematic design of experiments established in the design of experiments establishing step S22, thereby making it possible to save a lot of time and resources.

In the moisture measuring step S23, at least any one of a humidity at the outlet of the hydrogen electrode or the oxygen electrode of the stationary fuel cell stack and a concentration of carbon monoxide or methane in reformed gas at a rear end of the fuel converting system depending on the changed value of the process variable is measured depending on the design of experiments established in the design of experiments establishing step S22.

In the model building-up step S30, an experiment model representing the correlation between the process variable and the quality variable collected in the modeling data collecting step S20 is built-up. In other words, the experiment model representing the correlation between the process variable and the quality variable may be built-up.

In the model building-up step S30, it is judged that flooding has occurred when the humidity predicted as a model in each of the hydrogen electrode and the oxygen electrode of the stationary fuel cell stack is equal to or larger than a flooding value predetermined based on 100%, and it is judged that the flooding has not occurred when the humidity is equal to or smaller than the flooding value. Generally, it is preferable that when the humidity is equal to or larger than 100%, it is judged that the flooding has occurred.

In the model accuracy verifying step S40, a coefficient of determination ($R^2$: R-square) depending on a regression analysis of the model built-up in the model building-up step S30 is verified. This is to verify the experiment model using the regression analysis.

The regression analysis is to describe another variable using one variable or analyze data by a predictable model. Here, a describing variable is called an independent variable or a descriptive variable, and a described or predicted variable is called a dependent variable or a reaction variable. The case in which the number of describing independent variables is one is called a single regression analysis, and the case in which the number of describing independent variables is two or more is called a multiple regression analysis.

The coefficient of determination ($R^2$) indicates how much a sample regression line describes a variation amount of Y, which is a dependent variable, and may be calculated as a result value of SSR/SST. Here, SSR is a value of the sum of square of a model, and SST is a value of the sum of square of a corrected total.

As the coefficient of determination calculated using regression coefficients calculated in the regression analysis becomes high, reliability becomes high.

In the model applying step S50, the model verified in the modeling accuracy verifying step S40 is applied in the case in which the coefficient of determination depending on the regression analysis of the model in the modeling accuracy verifying step S40 is a predetermined allowable value or more. In the case in which the coefficient of determination depending on the regression analysis of the model in the modeling accuracy verifying step S40 is less than the predetermined allowable value, the steps may be sequentially repeated from the modeling data collecting step S20.

According to the related art, since the correlation between the process variable and the quality variable is changed over time in the case in which a generally produced and supplied stationary fuel cell system is operated, when an initially set model is continuously applied, a problem that reliability of a result of predicting the quality variable based on the process variable is gradually decreased occurs. In the present invention, which relates to a method for applying an optimal experiment model verifying a correlation between a process variable and a quality variable in real time in order to solve this problem, reliability in predicting the quality variable may be increased by connecting the connecting unit 100 to the control unit for being connected to the outside of the stationary fuel cell system that has been already installed and is being operated.

The apparatus and the method for soft-sensing a fuel cell system according to an exemplary embodiment of the present invention are an apparatus and a method of receiving a process variable of a vehicle fuel cell system to predict a quality variable of the vehicle fuel cell system in real time and providing the quality variable that is used as information for improving stability in operating the fuel cell system and performance of the fuel cell system and may not be directly measured, in real time.

A general fuel cell vehicle is directly charged with a hydrogen fuel and uses the hydrogen fuel. As a fuel, which is an energy source of the fuel cell, hydrogen, methanol, gasoline, and the like, may be used. However, in the case of the methanol and the gasoline, there are a technical difficulty that a hydrogen generating apparatus (reformer) should be added and a high cost problem. Therefore, in a current general fuel cell vehicle, the hydrogen has simply been injected as the fuel.

As shown in FIG. 7, a vehicle fuel cell system 40 of the fuel cell vehicle directly charged with the hydrogen fuel and using the hydrogen fuel may be mainly configured to include a vehicle fuel cell module 10 and an electric vehicle module 20. The vehicle fuel cell module 10 may be configured to include a vehicle fuel cell stack 11, a DC to DC converter 12, and a BOP 13. Here, the BOP 13 may be a stack air blower, a stack cooling water pump, a stack humidifier, a hydrogen supplying device (hydrogen tank, regulator, or controller), a recirculation device (blower or ejector), a heat exchanger, a radiator, a cooling fan, a control device, various valves and sensors, and the like. In addition, the electric vehicle module 20 may be configured to include a battery 29, a vehicle auxiliary device 21, a DC to AC inverter 22, a motor 23, a transmission 24, and a wheel 25. Here, the battery 29 may be omitted.

An operation principle of the fuel cell vehicle directly charged with the hydrogen fuel and using the hydrogen fuel will be schematically described. When the hydrogen fuel 30 is supplied to the vehicle fuel cell stack 11, electricity is generated. The generated electricity is converted into required DC electric power using the DC to DC converter 12, and the converted DC electric power is supplied to the BOP 13 and the battery 29. The electric power supplied to the battery 29 is supplied to the vehicle auxiliary device 21 and the DC to AC inverter 22. The electric power supplied to the DC to AC inverter is converted into AC electric power, and the converted AC electric power drives the motor 23. Power transformed into mechanical energy by the motor 23 is transferred to the wheel 25 through the transmission 24 to driven the fuel cell vehicle.

If the battery 29 is omitted, the converted DC electric power is supplied to the BOP 13, the vehicle auxiliary device 21, and the DC to AC inverter.

As shown in FIG. 8, an apparatus for soft-sensing a fuel cell system according to an exemplary embodiment of the present invention is configured to include a connecting unit 110, a collecting unit 200, a quality variable predicting unit 300, and a monitoring unit 400.

The general vehicle fuel cell module 10 includes a control unit (not shown)) receiving information on a state of the vehicle fuel cell stack 11 to control the fuel cell and capable of being connected to the outside. The control unit (not shown) for being connected to the outside may be included in the vehicle fuel cell module 10 or the electric vehicle module 20 or may be included in the vehicle fuel cell system 40 including the vehicle fuel cell module 10 and the electric vehicle module 20.

The connecting unit 100 is connected to a control unit in the vehicle fuel cell system 40. Here, the connecting unit 100 may provide information required by the collecting unit 200 and may be connected to the vehicle fuel cell module 10, the electric vehicle module 20, or the control unit in the vehicle fuel cell system 40.

The collecting unit 200 is connected to the connecting unit 100 and receives data of the vehicle fuel cell system 40. The data input from the vehicle fuel cell system 40 may be a directly measured data, a data input from the outside, and a data calculated using the directly measured data. Here, the collecting unit 200 may collect at least any one of a hydrogen flow rate at an inlet of a hydrogen electrode of the vehicle fuel cell stack, a hydrogen stoichiometric number at the inlet of the hydrogen electrode of the vehicle fuel cell stack, a hydrogen humidity at the inlet of the hydrogen electrode of the vehicle fuel cell stack, an oxygen flow rate at an inlet of an oxygen electrode of the vehicle fuel cell stack, an oxygen stoichiometric number at the inlet of the oxygen electrode of the vehicle fuel cell stack, an oxygen humidity at the inlet of the oxygen electrode of the vehicle fuel cell stack, a pressure difference between the inlet and an outlet of the hydrogen electrode of the vehicle fuel cell stack, a pressure difference between the inlet and an outlet of the oxygen electrode of the vehicle fuel cell stack, and an operation current of the vehicle fuel cell stack.

The quality variable predicting unit 300 is connected to the collecting unit 200 and predicts a quality variable of the vehicle fuel cell system 40 based on the received data. Here, the quality variable predictable by the quality variable predicting unit 300 may be a flooding index of the vehicle fuel cell stack. A phenomenon that water is not normally discharged to the outside in a cell of a polymer electrolyte fuel cell is called flooding. When the flooding occurs, it is difficult for the fuel and the oxygen to move to an electrode catalyst, such that a voltage of the cell is decreased. The flooding is one of the main causes intensifying a voltage deviation between cells particularly in the stack.

In the case in which the fuel and the air are not uniformly supplied to the respective cells in the stack, a flooding phenomenon may occur in a specific cell having a relatively low flow rate. Since the flooding may occur due to various causes such as a differential pressure between an inlet and an outlet of the stack, a utilization ratio of a fuel or air, an operation temperature of the stack, a cooling water temperature deviation between the inlet and the outlet, and the like, it is very important to manage the water in the stack.

The monitoring unit 400 is connected to the quality variable predicting unit 300 and output the predicted quality variable. The monitoring unit 400 may be included in a driver's seat of the fuel cell vehicle to perform monitoring.

When the apparatus 1000 for soft-sensing a fuel cell system according to an exemplary embodiment of the present invention is to be connected to the fuel cell vehicle, in the case in which all components of the apparatus 1000 for soft-sensing a fuel cell system are formed as one assembly, the vehicle fuel cell system 40 is installed at the rear of a general fuel cell vehicle, the bottom thereof, the front thereof, and the like, such that in the case in which all components of the apparatus 1000 for soft-sensing a fuel cell system according to an exemplary embodiment of the present invention are installed in the vehicle fuel cell system 40, it may be difficult to directly monitor and operate them on the driver' seat. Therefore, the connecting unit 100 is connected to other components through a cable and is connected to the control unit of the vehicle fuel system 40, thereby making it possible to freely dispose other components. In addition, since the apparatus 1000 for soft-sensing a fuel cell system according to an exemplary embodiment of the present invention is an apparatus for performing an electronic control, the connecting unit 100 is spaced apart from the vehicle fuel cell system 40 generating a high voltage by a predetermined distance to decrease an electromagnetic wave noise unnecessarily generated from an electric and electronic device, such as electromagnetic interference (EMI), electromagnetic susceptibility (EMS), and the like, thereby making it possible to enhance electromagnetic immunity.

As shown in FIG. 9, the apparatus 1000 for soft-sensing a fuel cell system according to an exemplary embodiment of the present invention may further include a power supplying unit 600 including a battery for supplying power and supplying the power to the apparatus 1000 for soft-sensing a fuel cell system.

As shown in FIG. 10, the apparatus 1000 for soft-sensing a fuel cell system according to an exemplary embodiment of the present invention may further include a data storing unit 700 and a fuel cell analyzing unit 800.

The data storing unit 700 is connected to the quality variable predicting unit 300 and stores and manages all data. Here, the stored data may be process variables collected by the collecting unit, quality variables predicted based on the process variables, an experiment model built-up for predicting the quality variables, a period in which the experiment model is applied to predict the quality variables, and the like.

The fuel cell analyzing unit 800 is connected to the data storing unit 700 and interprets the vehicle fuel cell system 40 to estimate a feature of the vehicle fuel cell system 40. Here, information on the interpreted feature of the vehicle fuel cell system 40 may be used as a study data for improving performance, a lifespan, and the like, of the vehicle fuel cell system 40 in the future.

As shown in FIG. 5, a method for soft-sensing a fuel cell system according to an exemplary embodiment of the present invention by the apparatus 1000 for soft-sensing a fuel cell system detachable from a control unit in a vehicle fuel cell system 40 and configured to include a connecting unit 100, a collecting unit 200, a quality variable predicting unit 300, and a monitoring unit 400 is configured to include a process variable selecting step S10, a modeling data collecting step S20, a model building-up step S30, a model accuracy verifying step S40, and a model applying step S50.

In the process variable selecting step S10, a process variable having an effect on a quality variable is selected. Here, the process variable in the process variable selecting step S10 may be at least any one of a hydrogen flow rate at an inlet of a hydrogen electrode of a vehicle fuel cell stack, a hydrogen stoichiometric number at the inlet of the hydrogen electrode of the vehicle fuel cell stack, a hydrogen humidity at the inlet of the hydrogen electrode of the vehicle fuel cell stack, an oxygen flow rate at an inlet of an oxygen electrode of the vehicle fuel cell stack, an oxygen stoichiometric number at the inlet of the oxygen electrode of the vehicle fuel cell stack, an oxygen humidity at the inlet of the oxygen electrode of the vehicle fuel cell stack, a pressure difference between the inlet and an outlet of the hydrogen electrode of the vehicle fuel cell stack, a pressure difference between the inlet and an outlet of the oxygen electrode of the vehicle fuel cell stack, and an operation current of the vehicle fuel cell stack.

In the modeling data collecting step S20, measurement results of a flooding index of a hydrogen electrode of the vehicle fuel cell stack or a flooding index of an oxygen electrode of the vehicle fuel cell stack, which is the quality variable, depending on a variation of the process variable selected in the process variable selecting step S10 are collected.

As shown in FIG. 6, the modeling data collecting step S20 may include an operation range setting step S21, an design of experiments establishing step S22, and a humidity measuring step S23.

In the operation range setting step S21, an operable range of the process variable selected in the process variable selecting step S10 is set.

In the design of experiments establishing step S22, a systematic design of experiments of the process variable depending on the operable range set in the operation range setting step S21 is established. In other words, since a lot of time and resources are consumed in order to measure all values based on the operable range set in the operation range setting step S21, values to be used for measurement in the operable range of the process variable may be set depending on the systematic design of experiments.

In the moisture measuring step S23, a humidity at the outlet of the hydrogen electrode or the oxygen electrode of the vehicle fuel cell stack depending on the changed value of the process variable is measured depending on the design of experiments established in the design of experiments establishing step S22.

In the model building-up step S30, an experiment model representing the correlation between the process variable and the quality variable collected in the modeling data collecting step S20 is built-up. In the model building-up step S30, when the humidity predicted as a model in each of the hydrogen electrode and the oxygen electrode of the vehicle fuel cell stack is equal to or larger than a flooding value predetermined based on 100%, it is judged that flooding has occurred, and when the humidity is equal to or smaller than the flooding value, it is judged that the flooding has not occurred. Generally, it is preferable that when the humidity is equal to or larger than 100%, it is judged that the flooding has occurred.

In the model accuracy verifying step S40, a coefficient of determination ($R^2$: R-square) depending on a regression analysis of the model built-up in the model building-up step S30 is verified.

The regression analysis is to describe another variable using one variable or analyze data by a predictable model. Here, a describing variable is called an independent variable or a descriptive variable, and a described or predicted variable is called a dependent variable or a reaction variable. The case in which the number of describing independent variables is one is called a single regression analysis, and the case in which the number of describing independent variables is two or more is called a multiple regression analysis.

The coefficient of determination ($R^2$) indicates how much a sample regression line describes a variation amount of Y, which is a dependent variable, and may be calculated as a result value of SSR/SST. Here, SSR is a value of the sum of square of a model, and SST is a value of the sum of square of a corrected total.

As the coefficient of determination calculated using regression coefficients calculated in the regression analysis becomes high, reliability becomes high.

In the model applying step S50, the model verified in the modeling accuracy verifying step S40 is applied in the case in which the coefficient of determination depending on the regression analysis of the model in the modeling accuracy verifying step S40 is a predetermined allowable value or more. In the case in which the coefficient of determination depending on the regression analysis of the model in the modeling accuracy verifying step S40 is less than the predetermined allowable value, the steps may be sequentially repeated from the modeling data collecting step S20.

With the apparatus and the method for soft-sensing a fuel cell system according to exemplary embodiments of the present invention, the quality variable is predicted based on the process variable in real time, such that the quality variable that is used as information for improving stability in operating the fuel cell system and improving performance of the fuel cell system and may not be directly measured may be provided in real time.

The present invention is not limited to the above-mentioned exemplary embodiments, and may be variously applied, and may be variously modified without departing from the gist of the present invention claimed in the claims.

What is claimed is:

1. An apparatus for soft-sensing a fuel cell system, comprising:
    a connecting unit detachable from a control unit for being connected to an outside of a stationary fuel cell system;
    a collecting unit connected to the connecting unit and receiving data of the stationary fuel cell system, the data including at least a process variable;
    a quality variable predicting unit connected to the collecting unit and predicting a quality variable of the stationary fuel cell system based on an experimental model representing a correlation between the process variable and the quality variable previously measured depending on a changed value of the process variable; and
    a monitoring unit connected to the quality variable predicting unit and outputting the predicted quality variable,
    wherein the quality variable predicting unit is configured to predict the quality variable predictable including at least any one of a concentration of carbon monoxide in a reformed gas at a rear end of a fuel converting system, and a concentration of methane in the reformed gas at the rear end of the fuel converting system.

2. The apparatus for soft-sensing a fuel cell system of claim 1, wherein the process variable is at least any one of a reformer operation temperature, a reformer injection fuel flow rate, a shift converter operation temperature, a shift converter injection flow rate, a carbon monoxide cleaner operation temperature, a carbon monoxide cleaner injection flow rate, a burner pressure, a burner air fuel ratio (ratio between injected air and fuel), a hydrogen flow rate at an inlet of a hydrogen electrode of a stationary fuel cell stack, a hydrogen stoichiometric number at the inlet of the hydrogen electrode of the stationary fuel cell stack, a hydrogen humidity at the inlet of the hydrogen electrode of the stationary fuel cell stack, an oxygen flow rate at an inlet of an oxygen electrode of the stationary fuel cell stack, an oxygen stoichiometric number at the inlet of the oxygen electrode of the stationary fuel cell stack, an oxygen humidity at the inlet of the oxygen electrode of the stationary fuel cell stack, a pressure difference between the inlet and an outlet of the hydrogen electrode of the stationary fuel cell stack, a pressure difference between the inlet and an outlet of the oxygen electrode of the stationary fuel cell stack, and an operation current of the stationary fuel cell stack.

3. The apparatus for soft-sensing a fuel cell system of claim 1, wherein the monitoring unit is included in a controlling unit controlling the stationary fuel cell system.

4. The apparatus for soft-sensing a fuel cell system of claim 1, further comprising: a power supplying unit including a battery for supplying power and supplying the power to the apparatus for soft-sensing a stationary fuel cell system.

5. The apparatus for soft-sensing a fuel cell system of claim 1, further comprising:
    a data storing unit connected to the quality variable predicting unit and storing and managing all data; and
    a fuel cell analyzing unit connected to the data storing unit and analyzing the stationary fuel cell system to estimate a feature of the stationary fuel cell system.

* * * * *